United States Patent [19]

Kawakami et al.

[11] Patent Number: 5,574,101

[45] Date of Patent: Nov. 12, 1996

[54] ACRYLIC RESIN COMPOSITION

[75] Inventors: Kiyoshi Kawakami; Yuzuru Ishibashi; Toshio Suzuki, all of Fuji, Japan

[73] Assignee: Asahi Kasei Kogyo Kabushiki Kaisha, Osaka, Japan

[21] Appl. No.: 453,070

[22] Filed: May 26, 1995

Related U.S. Application Data

[63] Continuation of Ser. No. 157,085, filed as PCT/JP92/00445 Apr. 9, 1992 published as WO93/21273 Oct. 28, 1993, abandoned.

[51] Int. Cl.$^6$ ................................... C08L 67/02
[52] U.S. Cl. ................. 525/92 A; 525/88; 525/167; 524/127; 524/128; 524/157; 524/158; 524/161; 524/166
[58] Field of Search ................ 525/167, 183, 525/88, 92 A; 524/127, 128, 157, 158, 161, 166

[56] References Cited

U.S. PATENT DOCUMENTS

| | | | |
|---|---|---|---|
| 4,536,563 | 8/1985 | Okitsu et al. | 528/279 |
| 5,166,309 | 11/1992 | Maj et al. | 528/272 |
| 5,331,061 | 2/1994 | Liedloff | 525/425 |
| 5,395,870 | 3/1995 | Suzuki et al. | 524/136 |

FOREIGN PATENT DOCUMENTS

| | | |
|---|---|---|
| 55-36237 | 3/1980 | Japan . |
| 60-23435 | 2/1985 | Japan . |
| 60-202150 | 10/1985 | Japan . |
| 62-119256 | 5/1987 | Japan . |
| 1090246 | 9/1987 | Japan . |
| 63-63739 | 3/1988 | Japan . |
| 64-60647 | 3/1989 | Japan . |
| 64-90246 | 4/1989 | Japan . |
| 1308444 | 12/1989 | Japan . |
| 2255753 | 10/1990 | Japan . |

*Primary Examiner*—Ana Woodward
*Attorney, Agent, or Firm*—Birch, Stewart, Kolasch & Birch, LLP

[57] ABSTRACT

An acrylic resin composition comprising at least one polyamide elastomer consisting of hard segments and soft segments in a specified ratio, an acrylic resin and optionally at least one electrolyte, which has excellent permanent antistatic properties, is good in transparency, has a very faint color, is inexpensive, and is only slightly deteriorated in transparency even when immersed in water.

6 Claims, No Drawings

ACRYLIC RESIN COMPOSITION

This application is a continuation of application Ser. No. 08/157,085, filed as PCT/JP92/00445 Apr. 9, 1992 published as WO93/21273 Oct. 28, 1993, now abandoned.

TECHNICAL FIELD

The present invention relates to a novel, antistatic, transparent acrylic resin composition, more particularly an acrylic resin composition which has excellent permanent antistatic properties, is inexpensive, has good transparency, and is suitable, for example, as a material capable of preventing electrostatic electrification in various parts of electronics products, household appliances, office automation appliances and the like, such as illuminators, nameplates on machinery and tools, and meter covers.

BACKGROUND ART

Acrylic resins have been widely used, for example, as materials for various parts of electronics products, household appliances, office automation appliances, etc. because of their excellent transparency and stiffness.

However, since the acrylic resins are easily electrified by friction or the like because of their high surface resistivity, they are disadvantageous, for example, in that they are deteriorated in appearance by adhesion of rubbish or dust, or that they bring about an undesirable situation by electrostatic electrification in parts of electronic equipments, etc. Therefore, it is desirable to develop a material having not only the excellent characteristics of the acrylic resins, but also antistatic properties.

As a method for imparting antistatic properties to the acrylic resin, there is well known, for example, a method of kneading a surfactant with the acrylic resin, or applying a surfactant on the surface of the acrylic resin. However, according to such a method, imparting permanent antistatic properties is difficult because the surfactant present on the surface is easily removed by water washing, friction or the like.

As methods for imparting permanent antistatic properties, there have been disclosed, for example, (1) a method of kneading a vinyl copolymer having a polyoxyethylene chain and a sulfonate, carboxylate or quaternary ammonium salt structure, with an acrylate resin (Japanese Patent Unexamined Publication Nos. 55-36237 and 63-63739), (2) a method of kneading a polyether ester amide with a methyl methacrylate-butadiene-styrene copolymer (an MBS resin) or a methyl methacrylate-acrylonitrile-butadiene-styrene copolymer (an MABS resin) (Japanese Patent Unexamined Publication No. 62-119256), and (3) a method of adding a polyamide elastomer, a modified vinyl polymer having at least one functional group such as carboxyl group, epoxy group or hydroxyl group, and optionally a rubber graft copolymer to an acrylate resin to obtain a permanently antistatic resin which is free from exfoliation and excellent in surface gloss (Japanese Patent Unexamined Publication No. 1-308444). In addition, there has also been disclosed, for example, (4) a method of kneading a polyether block amide with an acrylate resin (Japanese Patent Unexamined Publication No. 64-90246).

However, in the method described in (1) above, the vinyl copolymer blended is a special vinyl monomer and hence is expensive, and the production cost of an acrylate resin composition obtained by blending the vinyl copolymer is, of course, unavoidably raised. Moreover, in particular, the method disclosed in Japanese Patent Unexamined Publication No. 55-36237 is disadvantageous, for example, in that heat resistance and the like, which are characteristic of the acrylate resin, are deteriorated because the amount of the vinyl copolymer that is blended is large. On the other hand, in the method described in (2) above, the transparency of the resulting composition is maintained by adjusting the difference in refractive index between the noncrystalline polyether ester amide and the MBS resin or the MABS resin to 0.02 or less, so that the degree of freedom of their combination is low. Furthermore, this method is disadvantageous in that when a poly(methyl methacrylate), a typical acrylic resin, is used, the difference in refractive index is difficult to adjust to a value in a desired range, so that the transparency is apt to be deteriorated.

The antistatic resin described in (3) above is obtained by adding a modified vinyl polymer having at least one specified functional group to a composition of an acrylate resin and a polyamide elastomer substantially incompatible therewith, to improve the compatibility, and thereby preventing exfoliation and imparting an antistatic effect. But, the antistatic resin is not always sufficiently transparent. In addition, the transparency of the antistatic resin described in (4) above is not satisfactory for practical purposes, judging from the value of the transmittance for whole light.

Acrylic resins are markedly characterized by their excellent transparency, but when other high-molecular weight compounds are kneaded with the acrylic resins to impart permanent antistatic properties to the acrylic resins, the compatibility between the acrylic resins and the other high-molecular weight compounds is poor, so that the transparency is often deteriorated. Even if a product having a good transparency can be obtained, sufficient antistatic effect cannot be obtained or the heat resistance is deteriorated. Moreover, when a high-molecular weight compound having a complicated structure is produced and then used for its exhibition of a sufficient antistatic effect, the production cost is raised and there cannot be obtained an acrylic resin having general-purpose properties, i.e., is not expensive, and has antistatic properties, that is entirely satisfactory for practical purposes.

Under these circumstances, there has been a desire to develop an acrylic resin composition which has excellent permanent antistatic properties, is inexpensive and is good in transparency.

The present inventors investigated acrylic resin compositions having excellent antistatic properties and transparency and previously found that a polyamide-imide elastomer having a low content of hard segments has good compatibility with acrylic resins, and is finely dispersed thereinto to give a transparent composition having excellent antistatic properties. The present inventors have disclosed this finding in Japanese Patent Unexamined Publication No. 2-255753. The polyamide-imide elastomer, however, is light-yellow and it is not always satisfactory because an acrylic resin containing the polyamide-imide elastomer is colored light-yellow. Furthermore, the polyamide-imide elastomer is not always satisfactory because when said acrylic resin composition is immersed in water, its transparency is deteriorated.

DISCLOSURE OF THE INVENTION

Under these circumstances, the present invention was made for providing an acrylic resin composition having excellent permanent antistatic properties, good transparency and a very faint color, which is only slightly deteriorated in transparency when immersed in water.

The present inventors earnestly investigated in order to develop an acrylic resin composition having the above-mentioned desirable properties, and consequently found the following: a polyamide elastomer obtained by block polymerization of soft segments composed of polyether segments containing polyoxyethylene residues in a specified proportion and having a specified number average molecular weight and hard segments composed of polyamide segments, in a specified ratio, has a relatively faint color and good compatibility with acrylic resins; blending of the polyamide elastomer in a predetermined proportion with an acrylic resin can give a composition which is excellent in antistatic properties, is transparent, has a very faint color, and is only slightly deteriorated in transparency when immersed in water; and further blending of a specified compound in a predetermined proportion together with said polyamide elastomer gives a composition having more improved antistatic properties. On the basis of the above finding, the present invention has been accomplished.

In detail, the present invention is as follows.

There is provided an acrylic resin composition characterized by comprising (A) 70 to 97% by weight of an acrylic resin, (B) 3 to 30% by weight of at least one polyamide elastomer, and (C) 0 to 10% by weight of at least one electrolyte selected from organic sulfonates and organic phosphates, the component (B) being composed of (a) polyamide segments and (b) polyether segments, wherein the content of the constituent (a) is 25 to 60% by weight, and the constituent (b) comprises polyoxyalkylene residues containing 30 to 99% by weight of polyoxyethylene residues and having a number average molecular weight of 500 to 4000.

BEST MODE FOR CARRYING OUT THE INVENTION

The present invention is explained below in detail.

In the composition of the present invention, as the acrylic resin used as component (A), there are exemplified homopolymers or copolymers of alkyl ester compounds such as methyl, ethyl, propyl or butyl esters of (meth)acrylic acid, for example, poly(methyl methacrylate)s, poly(ethyl methacrylate)s, poly(propyl methacrylate)s, poly(butyl methacrylate)s, poly(methyl acrylate)s, poly(ethyl acrylate)s, methyl methacrylatemethyl acrylate copolymers, methyl methacrylate-ethyl methacrylate copolymers, methyl methacrylate-butyl methacrylate copolymers, and methyl methacrylate-ethyl acrylate copolymers. These acrylic resins may be used alone or in combination of two or more thereof. The process for producing them is not critical, and there can be suitably used acrylic resins obtained by any of conventional suspension polymerization method, emulsion polymerization method, bulk polymerization method and the like.

In the present invention, the polyamide segments used as segments (a) in the polyamide elastomer used as component (B) are formed from a polymer obtained from one or more monomers capable of forming the polyamide, for example, an aminocarboxylic acid having 6 or more carbon atoms or a lactam, and/or a salt of a diamine having 4 or more carbon atoms and a dicarboxylic acid, and a dicarboxylic acid or a diamine as a connecting agent. The monomers capable of forming the polyamide include, for example, ω-aminocaproic acid, ω-aminoenanthic acid, ω-aminocaprylic acid, ω-aminoperagonic acid, ω-aminocapric acid, 11-aminoundecanoic acid, 12-aminododecanoic acid, caprolactam, enanthic lactam, caprylic lactam, lauric lactam, hexamethylene-diamine-adipic acid salt, hexamethylenediamine-sebacic acid salt, hexamethylenediamine-dodecanedicarboxylic acid salt, hexamethylenediamine-isophthalic acid salt, and hexamethylenediamine-terephthalic acid salt. In particular, there are preferably used ω-aminocaproic acid, 11-aminoundecanoic acid, 12-aminododecanoic acid, caprolactam, lauric lactam, hexamethylenediamine-adipic acid salt, hexamethylenediamine-sebacic acid salt, etc. These may be used alone or in combination of two or more thereof.

The polyamide used as hard segments is responsible for the heat resistance, and strength, hardness compatibility with the acrylic resin, of said elastomer, and the content of the polyamide in the elastomer should be in the range of 25 to 60% by weight (namely, the content of polyether segments as segments (b) is 75 to 40% by weight), preferably 25 to 45% by weight. When the content is less than 25% by weight, kneading of the elastomer with the acrylic resin results in deterioration of the antistatic properties. When the content exceeds 60% by weight, the compatibility is poor upon kneading of the elastomer with the acrylic resin, so that the transparency is deteriorated.

The number average molecular weight of the polyamide segments is chosen in the range of usually 400 to 3000, preferably 500 to 1200. When the number average molecular weight is less than 400, the melting point is low, so that the heat resistance of the resulting composition is low. When the number average molecular weight exceeds 3000, the transparency of the composition tends to be deteriorated. Therefore, both of such number average molecular weights are undesirable.

As the polyamide elastomer(s) as component (B) used in the present invention, a polyamide elastomer(s) represented by the following formula (s) (1) and/or (2) are preferable:

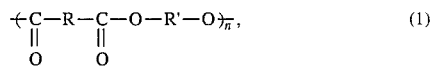 (1)

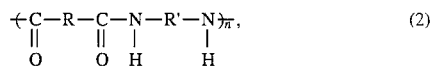 (2)

wherein

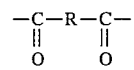

represents a polyamide segment and —O—R'—O— or

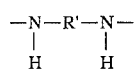

represents a polyether segment, and n represents a natural number.

Polyether segments as segments (b) may consist of polyoxyethylene residues derived from a polyoxyethylene modified with amino groups at both ends, and polyoxyalkylene residues derived from other polyoxyalkylenes modified with amino groups at both ends, or they may consist of polyoxyethylene residues derived from a polyoxyethylene glycol and polyoxyalkylene residues derived from other polyoxyalkylene glycols. Usually, it is sufficient that the glycols are chosen upon consideration of the availability of starting materials. For example, the following glycols may be used.

That is, as glycols which constitutes the polyoxyalkylene residues derived from the polyoxyalkylene glycol, there are used, for example, polyoxypropylene glycols, polyoxytetramethylene glycols, polyoxyhexamethylene glycols and polyoxyethylene-polyoxypropylene block copolymers. In addition, there can also be used copolymers obtained by copolymerizing butanediol, propylene glycol, neopentyl glycol, hydroquinone, etc. as ether components.

Of these glycols, in particular, combinations of a polyoxyethylene glycol and a polyoxytetramethylene glycol or a polyoxypropylene glycol, polyoxyethylene-polyoxypropylene block copolymers, and combinations of a polyoxyethylene-polyoxypropylene block copolymer and a polyoxyethylene glycol, are preferable because they give a transparent elastomer in a relatively wide range of the ratio of components. The combination of a polyoxyethylene glycol and a polyoxytetramethylene glycol is particularly preferable.

Of the above glycols, the polyoxyalkylene glycols, other than polyoxyethylene glycol, have the effect of reducing the hydrophilicity of the resulting elastomer moderately, and the hydrophilicity can be controlled by choosing the amount of the polyoxyalkylene glycols. It is preferable to choose the amount of the polyoxyalkylene glycols to adjust the percentage of the polyoxyethylene glycols based on the total weight of the glycols in the present invention to 99 to 30% by weight, particularly preferably to 95 to 50% by weight. When the amount of the polyoxyethylene glycol exceeds 99% by weight, an acrylic resin composition obtained by using the resulting elastomer has low stability under hygroscopic conditions and is decreased in antistatic capability, with an increase of haze value. When the amount is less than 30% by weight, it becomes difficult to obtain a transparent elastomer, and moreover the ability to impart antistatic capability is deteriorated. Therefore, it is not desirable.

The number average molecular weight of the total glycols should be in the range of 500 to 4000, and the number average molecular weights of the individual glycols should be chosen to adjust the number average molecular weight of the total glycols to a value in this range, by choosing the ratio of the glycols. When the number average molecular weight is less than 500, the number average molecular weight of polyamide segments as hard segments in the elastomer is decreased, so that the resulting elastomer has a low melting point and hence is difficult to set. On the other hand, when the number average molecular weight exceeds 4000, formation of a transparent elastomer becomes difficult.

As one or more groups for connecting polyamide segments (a) to polyether segments (b), an amide group, an ester group or a combination of an amide group and an ester group may be present. As the connecting agent, dicarboxylic acids or diamines can be used. The dicarboxylic acids may be either aliphatic dicarboxylic acids or aromatic dicarboxylic acids. Such dicarboxylic acids include, for example, adipic acid, sebacic acid, dodecanedicarboxylic acid, terephthalic acid, isophthalic acid, and cyclohexanedicarboxylic acid. They may be used alone or in combination of two or more thereof. A polyamide elastomer having a high molecular weight can be obtained by using the dicarboxylic acids in an amount substantially equimolar with the above-mentioned glycols.

The above-mentioned process for producing the polyamide elastomer is not critical, and any process may be employed so long as it gives a homogeneous and transparent elastomer. There can be employed, for example, a process comprising mixing the above-mentioned monomer(s) capable of forming the polyamide, glycols and dicarboxylic acid(s) in such a ratio that the amounts of the glycols and the dicarboxylic acid(s) are substantially equimolar with each other, and polymerizing them in the presence or absence of a solvent at a temperature in the range of preferably 150°–300° C., more preferably 180°–280° C. while eliminating water in the polymer generated by the reaction from the system by passing nitrogen gas through the reaction system or reducing the pressure to approximately 700–300 Torr. In this process, use of a dehydrating-condensation catalyst such as a titanium alkoxide or a zirconium alkoxide in dehydrating-condensation is advantageous because the reaction time is reduced and coloring of the polymer can be prevented. Since these catalysts tend to be inactivated in the presence of water, it is advantageous to add them after water in the reaction system has been eliminated from the system simultaneously with distilling-off of the unreacted monomer(s) capable of forming the amide. By addition in this manner, a high degree of polymerization can be attained in a short time and a transparent polyamide elastomer having a very faint color can be obtained.

As a usable solvent, there are preferably used solvents that are highly compatible with both the polyamide segments and the polyether segments, such as N-methylcaprolactam, N-methyl-2-pyrolidone, sulfolane, etc.

The polyamide elastomer used in the composition of the present invention preferably has such a transparency that the haze value at a thickness of 1 mm is 50% or less. When the haze value exceeds 50%, the transparency of the resulting composition tends to be deteriorated.

The degree of polymerization of the polyamide elastomer used in the composition of the present invention can be varied if necessary. The relative viscosity of a solution of said elastomer in m-cresol with an elastomer concentration of 0.5 w/v % is preferably 1.5 or more as measured at a temperature of 30° C. When the relative viscosity is less than 1.5, the elastomer does not have good mechanical properties, so that when the elastomer is kneaded with the acrylic resin, the composition tends to be insufficient in mechanical properties. A preferable relative viscosity is 1.6 or more.

In addition, various heat stabilizers such as thermal-age resistors, antioxidants and the like can be used for enhancing the heat stability of the resulting polyamide elastomer. They may be added during any of the initial, middle and last stages of the polymerization. They may also be added at the time of kneading the polyamide elastomer with the acrylic resin.

As the heat stabilizers, there are used, for example, various hindered phenols such as 1,3,5-trimethyl-2,4,6-tris(3,5-di-t-butyl-4-hydroxybenzyl)benzene, N,N'-hexamethylenebis(3,5-di-t-butyl-4-hydroxycinnamamide), 4,4'-bis(2,6-di-t-butylphenol), 2,2'-methylenebis(4-ethyl-6-t-butylphenol), pentaerythrityl-tetrakis[3-(3,5-di-t-butyl-4-hydroxyphenyl)propionate], etc.; aromatic amines such as N,N'-bis(β-naphthyl)-p-phenylenediamine, N,N'-diphenyl-p-phenylenediamine, poly(2,2,4-trimethyl-1,2-dihydroquinoline), etc.; sulfur compounds such as dilaurylthiodipropionate, etc.; and phosphorus compounds such as tris(2,4-di-t-butylphenyl) phosphite, etc.

The composition of the present invention is obtained by blending the above-mentioned acrylic resin as component (A) and the polyamide elastomer as component (B) so that the composition contains the acrylic resin in an amount of 70 to 97% by weight, preferably 80 to 95% by weight, and more preferably 85 to 95% by weight and the polyamide elastomer in an amount of 3 to 30% by weight, preferably 5 to 20% by weight, and more preferably 5 to 15% by weight. When the blending proportion of the component (B) is less than 3% by weight, sufficient antistatic effect cannot be obtained. When the blending proportion exceeds 30% by weight, the stiffness tends to be deteriorated.

The thus obtained acrylic resin composition has excellent antistatic properties and transparency. When the composition is used as a transparent acrylic resin composition, there is preferably used the composition which has a haze value at a thickness of 2 mm of 15% or less.

In the present resin composition, there can be employed a process comprising kneading a mixture of the component (A) and the component (B) by a conventional method, for example, use of a Banbury mixer, mixing roll, single-screw or twin-screw extruder, or the like. As to the kneading temperature in this case, the kneading is carried out preferably in the range of 180°–80° C.

In the present invention, organic sulfonates and organic phosphates can be used as component (C) for further improvement of the antistatic effect. The organic sulfonates and organic phosphates include, for example, alkali metal salts and alkaline earth metal salts of aromatic sulfonic acids such as dodecylbenzenesulfonic acid, p-toluenesulfonic acid, dodecylphenyl ether disulfonic acid, naphthalenesulfonic acid, etc.; alkylsulfonic acids such as laurylsulfonic acid, etc.; and organic phosphoric acids such as diphenyl phosphite, diphenyl phosphate, etc. Of these, the alkali metal salts are preferable and sodium salts and potassium salts are particularly preferable.

As the component (C), they may be used alone or in combination of two or more thereof. The content of the component (C) is chosen in the range of 0.05 to 10% by weight, preferably 0.1 to 5% by weight, and more preferably 0.5 to 2.0% by weight. When the content exceeds 10% by weight, undesirable situations such as deterioration of the stiffness, surface roughness of a molded product of the composition, or coloring during molding arise.

It is possible to incorporate into the resin composition of the present invention other ingredients, for example, dyes, ultraviolet absorbers, weathering stabilizers, heat stabilizers, antioxidants, lubricants, plasticizers, mold release agents, polyoxyethylene glycols and other polymers, in an optional step such as a kneading step or a molding step, so long as these other ingredients do not deteriorate the physical properties of the resin composition.

The thus obtained acrylic resin composition of the present invention can be molded, shaped or formed by well-known methods generally used for molding, shaping or forming thermoplastic resins, for example, injection molding, extrusion, blow molding and vacuum forming.

EXAMPLES

The present invention is illustrated below in further detail with examples, but is not limited at all by the examples.

Properties of compositions and elastomers were determined according to the following methods.

(1) Relative viscosity of elastomer

Measured in m-cresol under conditions of 30° C. and 0.5 w/v %.

(2) Haze value of elastomer

An elastomer was held between polycarbonate transparent films of 0.4 mm in thickness, Panlite sheet, mfd. by TEIJIN Chemical Co., Ltd., to produce an elastomer sheet of 1 mm in thickness, and the haze value of the whole elastomer sheet including the polycarbonate sheets was measured according to JIS K-7105, by means of a haze meter mfd. by NIPPON DENSYOKU Co., Ltd.

(3) Surface resistivity of composition

Using a 50×55×2 mm molded sample, the surface resistivity was determined by measuring the resistance at an applied voltage of 500V, by using an electrometer TR 8651 and electrodes manufactured by ADVANTEST Co., Ltd., and a shielding box and electrode holders manufactured by ANDO Electric Co., Ltd.

(4) Transmittance for whole light and haze value of composition

Measured according to the method described in JIS K-7105 by means of a haze meter mfd. by NIPPON DENSYOKU Co., Ltd., using a 50×55×2 mm molded sample.

(5) Yellowness of composition

Measured by a transmission method according to the method described in JIS K-7103 by means of a calorimetric differential calorimeter mfd. by NIPPON DENSYOKU Co., Ltd., using a 50×50×2 mm molded sample.

(6) Flexural modulus of composition

Measured at 23° C. and 55% RH according to ASTM D-790, using a test piece of ⅛ inch in thickness.

Preparation Example 1

Preparation of polyamide elastomer (A-1)

Into a 10-liter SUS-made reactor equipped with a stirrer, nitrogen inlet, distillate outlet tube and catalyst-feeding pot were charged 2240 g of a polyoxyethylene glycol having a number average molecular weight of 1490, 560 g of a polyoxytetramethylene glycol having a number average molecular weight of 1830, 301 g of terephthalic acid, 1250 g of caprolactam and 8 g of 1,3,5-trimethyl-2,4,6-tris(3,5-di-t-butyl-4-hydroxybenzyl)benzene. The reaction was carried out at 220° C. for 2 hours while passing nitrogen at a rate of 100 ml/min, and then at 250° C. for 2 hours while passing nitrogen at a rate of 1000 ml/min. Subsequently, the pressure was gradually reduced to distill off the unreacted caprolactam, after which a solution of 8 g of tetrabutoxy zirconium in 50 g of caprolactam was added to the reaction system from the catalyst pot. The resulting mixture was subjected to reaction at 250° C. and 1 Torr for 3 hours. The molten polymer was taken out from the bottom of the reactor into water in the form of a strand, cooled and then cut with a pelletizer to obtain transparent polyamide elastomer chips.

This elastomer had a content of polyether segments of 70%, a polyoxyethylene glycol content of polyether segments of 80%, a haze value of 9%, and a relative viscosity of 1.9.

Preparation Example 2

Into the same reactor as used in Preparation Example 1 were charged 1980 g of a polyoxyethylene glycol having a number average molecular weight of 1490, 500 g of a polyoxytetramethylene glycol having a number average molecular weight of 1830, 267 g of terephthalic acid, 550 g of 12-aminododecanoic acid and 8 g of 1,3,5-trimethyl-2,4, 6-tris(3,5-di-t-butyl-4-hydroxybenzyl)benzene. The reaction was carried out at 250° C. for 2 hours while passing nitrogen at a rate of 100 ml/min. Further, 1160 g of caprolactam was added and the resulting mixture was subjected to reaction at 250° C. for 3 hours, while passing nitrogen at a rate of 1000 ml/min. Subsequently, the pressure was gradually reduced to distill off the unreacted caprolactam, after which a solution of 8 g of tetrabutoxy zirconium in 50 g of caprolactam was added to the reaction system from the catalyst pot, and the reaction was carried out at 250° C. and 1 Torr for 3 hours. Thereafter, the same treatment as described in Preparation Example 1 was carried out to obtain chips of polyamide elastomer (A-2).

This elastomer had a content of polyether segments of 62%, a polyoxyethylene glycol content of polyether segments of 80%, a haze value of 6%, and a relative viscosity of 2.0.

Preparation Example 3

Into the same reactor as used in Preparation Example 1 were charged 2050 g of a polyoxyethylene glycol having a number average molecular weight of 1490, 510 g of a polyoxytetramethylene glycol having a number average molecular weight of 1830, 335 g of sebacic acid, 1520 g of caprolactam, 43 g of hexamethylenediamine adipate and 8 g of 1,3,5-trimethyl-2,4,6-tris(3,5-di-t-butyl-4-hydroxybenzyl)benzene. The reaction was carried out at 250° C. for 3 hours while passing nitrogen at a rate of 1000 ml/min. Subsequently, the pressure was gradually reduced to distill off the unreacted caprolactam, after which a solution of 8 g of tetrabutoxy zirconium in 50 g of caprolactam was added to the reaction system from the catalyst pot, and the resulting mixture was subjected to reaction at 240° C. and 1 Torr for 4 hours. Thereafter, the same treatment as described in Preparation Example 1 was carried out to obtain chips of polyamide elastomer (A-3).

This elastomer had a content of polyether segments of 64%, a polyoxyethylene glycol content of polyether segments of 80%, a haze value of 7%, and a relative viscosity of 2.1.

Preparation Example 4

Preparation of polyamide elastomer (A-4)

Into the same reactor as used in Preparation Example 1 were charged 1920 g of a polyoxyethylene glycol having a number average molecular weight of 1490, 480 g of a polyoxytetramethylene glycol having a number average molecular weight of 1830, 239 g of adipic acid, 1750 g of caprolactam, 117 g of hexamethylenediamine adipate and 8 g of pentaerythrityl-tetrakis[3-(3,5-di-t-butyl-4-hydroxyphenyl) propionate]. The reaction was carried out at 250° C. for 3 hours while passing nitrogen at a rate of 1000 ml/min. Thereafter, the same procedure as described in Preparation Example 1 was followed to obtain chips of polyamide elastomer (A-4).

This elastomer had a content of polyether segments of 59%, a polyoxyethylene glycol content of polyether segments of 80%, a haze value of 11%, and a relative viscosity of 2.1.

Preparation Example 5

Preparation of polyamide elastomer (A-5)

Into a 500-ml glass reactor equipped with a stirrer, nitrogen inlet and distillate outlet tube were charged 64.0 g of a polyoxyethylene glycol having a number average molecular weight of 1490, 64.0 g of a polyoxytetramethylene glycol having a number average molecular weight of 1830, 15.8 g of sebacic acid, 77.5 g of caprolactam, 2.0 g 0f hexamethylenediamine adipate and 0.4 g of pentaerythrityl-tetrakis [3-(3,5-di-t-butyl-4-hydroxyphenyl) propionate]. The reaction was carried out at 260° C. for 4 hours while passing nitrogen at a rate of 90 ml/min. Subsequently, the pressure was gradually reduced to distill off the unreacted caprolactam, and was then brought back to atmospheric pressure, after which 0.4 g of tetrabutoxy zirconium was added and the resulting mixture was subjected to reaction at 260° C. and 1 Torr for 1.0 hour. The molten polymer was taken out from the bottom of the reactor into water in the form of a strand, cooled and then cut with a pelletizer to obtain transparent polyamide elastomer chips (A-5).

This elastomer had a content of polyether segments of 63%, a polyoxyethylene glycol content of polyether segments of 50%, a haze value of 9%, and a relative viscosity of 2.1.

Preparation Example 6

Preparation of polyamide elastomer (A-6)

Polyamide elastomer chips (A-6) were obtained in the same manner as in Preparation Example 5 except for charging 134 g of a polyoxyethylene-polyoxypropylene glycol block copolymer having a number average molecular weight of 3330 ("PLONON#204" mfd. by Nippon Oils and Fats Co., Ltd.), 8.2 g of sebacic acid, 85 g of caprolactam and 0.4 g of pentaerythrityl-tetrakis[3-(3,5-di-t-butyl-4-hydroxyphenyl) propionate].

This elastomer had a content of polyether segments of 67%, a polyoxyethylene glycol content of polyether segments of 40%, a haze value of 15%, and a relative viscosity of 2.1.

Preparation Example 7

Preparation of polyamide elastomer (A-7)

Into the same reactor as used in Preparation Example 5 were charged 88 g of a polyoxyethylene glycol having a number average molecular weight of 993, 22 g of a polyoxytetramethylene glycol having a number average molecular weight of 1830, 20.5 g of sebacic acid, 81.0 g of hexamethylenediamine adipate, 0.06 g of antimony trioxide, 100 g of N-methyl-2-pyrolidone and 0.4 g of 1,3,5-trimethyl-2,4,6-tris(3,5-di-t-butyl-4-hydroxybenzyl)benzene. The reaction was carried out at 200° C. for 1 hour while passing nitrogen at a rate of 10 ml/min. Then, the reaction was carried out at 260° C. for 3 hours while passing nitrogen at a rate of 90 ml/min, after which the pressure was reduced to distill off the solvent. After the pressure was brought back to atmospheric pressure, 0.4 g of tetrabutoxy zirconium was added, and the resulting mixture was subjected to reaction at 260° C. and 1 Torr for 2.0 hours. Thereafter, the same treatment as described in Preparation Example 5 was carried out to obtain polyamide elastomer chips (A-7).

This elastomer had a content of polyether segments of 55%, a polyoxyethylene glycol content of polyether segments of 80%, a haze value of 12%, and a relative viscosity of 1.8.

Preparation Example

Preparation of polyamide elastomer (A-8)

Polyamide elastomer chips (A-8) were obtained in the same manner as in Preparation Example 7 except for charging 104 g of a polyoxyethylene glycol having a number average molecular weight of 1490, 26 g of a polyoxytetramethylene glycol having a number average molecular weight of 1830, 24.2 g of sebacic acid, 51.8 g of hexamethylenediamine sebacate, 0.06 g of antimony trioxide, 100 g of N-methyl-2-pyrolidone and 0.4 g of 1,3,5-trimethyl-2, 4,6-tris(3,5-di-t-butyl-4-hydroxybenzyl)benzene.

This elastomer had a content of polyether segments of 65%, a polyoxyethylene glycol content of polyether segments of 80%, a haze value of 10%, and a relative viscosity of 2.0.

Preparation Example 9

Preparation of polyamide elastomer (A-9)

Polyamide elastomer chips (A-9) were obtained in the same manner as in Preparation Example 7 except for charging 85 g of a polyoxyethylene glycol having a number average molecular weight of 1490, 21 g of a polyoxytetramethylene glycol having a number average molecular weight of 1830, 13.8 g of sebacic acid, 88 g of 11-aminoundecanoic acid, 0.06 g of antimony trioxide, 100 g of N-methyl-2-pyrolidone and 0.4 g of 1,3,5-trimethyl-2,4,6-tris(3,5-di-t-butyl-4-hydroxybenzyl)benzene.

This elastomer had a content of polyether segments of 53%, a polyoxyethylene glycol content of polyether segments of 80%, a haze value of 9%, and a relative viscosity of 1.9.

Preparation Example 10

Preparation of polyamide elastomer (A-10)

Into the same reactor as used in Preparation Example 5 were charged 96 g of a polyoxyethylene glycol having a number average molecular weight of 1490, 24 g of a polyoxytetramethylene glycol having a number average molecular weight of 1830, 17.8 g of dodecanedicarboxylic acid, 67.8 g of 12-aminododecanoic acid and 0.4 g of 1,3,5-trimethyl-2,4,6-tris(3,5-di-t-butyl-4-hydroxybenzyl)benzene. The reaction was carried out at 200° C. for 1 hour while passing nitrogen at a rate of 10 ml/min. Then, the reaction was carried out at 260° C. for 1 hour while passing nitrogen at a rate of 90 ml/min, after which the pressure was reduced to distill off generated water. After the pressure was brought back to atmospheric pressure, 0.4 g of tetrabutoxy zirconium was added, and the resulting mixture was subjected to reaction at 260° C. and 1 Torr for 1.0 hour. Thereafter, the same treatment as described in Preparation Example 5 was carried out to obtain polyamide elastomer chips (A-10).

This elastomer had a content of polyether segments of 60%, a polyoxyethylene glycol content of polyether segments of 80%, a haze value of 4%, and a relative viscosity of 2.2.

Preparation Example 11

Preparation of polyamide elastomer (A-11)

Polyamide elastomer chips (A-11) were obtained in the same manner as in Preparation Example 10 except for charging 80 g of a polyoxyethylene glycol having a number average molecular weight of 1490, 20 g of a polyoxytetramethylene glycol having a number average molecular weight of 1830, 14.8 g of dodecanedicarboxylic acid, 92.8 g of 12-aminododecanoic acid and 0.4 g of 1,3,5-trimethyl-2,4,6-tris(3,5-di-t-butyl-4-hydroxybenzyl)benzene.

This elastomer had a content of polyether segments of 50%, a polyoxyethylene glycol content of polyether segments of 80%, a haze value of 5%, and a relative viscosity of 2.1.

Preparation Example 12

Preparation of polyamide elastomer (A-12)

Polyamide elastomer chips (A-12) were obtained in the same manner as in Preparation Example 5 except for charging 140 g of a polyoxytetramethylene glycol having a number average molecular weight of 1830, 12.7 g of terephthalic acid, 66 g of caprolactam and 0.4 g of 1,3,5-trimethyl-2,4,6-tris ( 3,5-di-t-butyl-4-hydroxybenzyl)benzene.

This elastomer had a content of polyether segments of 68%, contained no polyoxyethylene glycol, and had a haze value of 6%, and a relative viscosity of 1.9.

Preparation Example 13

Preparation of polyamide elastomer (A-13)

Polyamide elastomer chips (A-13) were obtained in the same manner as in Preparation Example 7 except for charging 110 g of a polyoxyethylene glycol having a number average molecular weight of 993, 22.5 g of sebacic acid, 78.3 g of hexamethylenediamine adipate, 0.06 g of antimony trioxide, 100 g of N-methyl-2-pyrolidone and 0.4 g of 1,3,5-trimethyl-2,4,6-tris(3,5-di-t-butyl-4-hydroxybenzyl)benzene.

Polyether segments of this elastomer were formed from the polyoxyethylene glycol alone, their content in the elastomer was 55%, and the elastomer had a haze value of 15% and a relative viscosity of 1.8.

Preparation Example 14

Preparation of polyamide elastomer (A-14)

Polyamide elastomer chips (A-14) were obtained in the same manner as in Preparation Example 7 except for charging 130 g of a polyoxyethylene glycol having a number average molecular weight of 1490, 17.7 g of sebacic acid, 58.3 g of hexamethylenediamine sebacate, 0.06 g of antimony trioxide, 100 g of N-methyl-2-pyrolidone and 0.4 g of 1,3,5-trimethyl-2,4,6-tris(3,5-di-t-butyl-4-hydroxybenzyl)benzene.

Polyether segments of this elastomer were formed from the polyoxyethylene glycol alone, their content in the elastomer was 65%, and the elastomer had a haze value of 11% and a relative viscosity of 2.0.

Preparation Example 15

Preparation of polyamide elastomer (A-15)

Polyamide elastomer chips (A-15) were obtained in the same manner as in Preparation Example 10 except for charging 120 g of a polyoxyethylene glycol having a number average molecular weight of 1490, 18.7 g of dodecanedicarboxylic acid, 67.0 g of 12-aminododecanoic acid and 0.4 g of 1,3,5-trimethyl-2,4,6-tris(3,5-di-t-butyl-4-hydroxybenzyl)benzene.

Polyether segments of this elastomer were formed from the polyoxyethylene glycol alone, their content in the elastomer was 60%, and the elastomer had a haze value of 4% and a relative viscosity of 2.2.

Preparation Example 16

Preparation of polyamide elastomer (A-16)

Chips of polyamide elastomer (A-16) were obtained in the same manner as in Preparation Example 3 except for charging 2560 g of a polyoxyethylene glycol having a number average molecular weight of 1490, 348 g of sebacic acid, 1500 g of caprolactam, 45 g of hexamethylenediamine adipate and 8 g of 1,3,5-trimethyl-2,4,6-tris(3,5-di-t-butyl-4-hydroxybenzyl)benzene.

Polyether segments of this elastomer were formed from the polyoxyethylene glycol alone, their content in the elastomer was 64%, and the elastomer had a haze value of 8% and a relative viscosity of 2.1.

Preparation Example 17

Preparation of polyamide elastomer (A-17)

Polymerization was carried out in the same manner as in Preparation Example 3 except for charging 2800 g of a polyoxyethylene glycol having a number average molecular weight of 1980, 272 g of trimellitic anhydride, 1330 g of caprolactam and 8 g of 1,3,5-trimethyl-2,4,6-tris(3,5-di-t-butyl-4-hydroxybenzyl)benzene. Then, the resulting polymer was taken out from the bottom of the reactor into water in the form of a strand and cooled by means of a cooling roll. The recovered strand was cut with a pelletizer to obtain chips of polyamide elastomer (A-17).

Polyether segments of this elastomer were formed from the polyoxyethylene glycol alone, their content in the elastomer was 71%, and the elastomer had a haze value of 8% and a relative viscosity of 2.3.

Preparation Example 18

Preparation of polyamide elastomer (A-18)

Into the same reactor as used in Preparation Example 5 were charged 94 g of a polyoxyethylene having an amine residue at each end and a number average molecular weight of 4000 ("IYONET Y400" mfd. by Sanyo Chemical Industries Ltd.), 40 g of a polyoxytetramethylene glycol having a number average molecular weight of 1,100, 50 g of N-methyl-ε-caprolactam and 0.4 g of 1,3,5-trimethyl-2,4,6-tris(3,5-di-t-butyl- 4-hydroxybenzyl)benzene. The mixture was heated at 100° C. to carry out dissolution. Subsequently, 12.2 g of sebacic acid and 65.8 g of caprolactam were added, and the reaction was carried out at 200° C. for 1 hour while passing nitrogen at a rate of 10 ml/min. Then, the reaction was carried out at 260° C. for 4 hours while passing nitrogen at a rate of 90 ml/min, after which the pressure was reduced to distill off the solvent and a small amount of caprolactam. After the pressure was brought back to atmospheric pressure, 0.4 g of tetrabutoxy zirconium was added, and the resulting mixture was subjected to reaction at 260° C and 1 Torr for 2.0 hours. Thereafter, the same treatment as described in Preparation Example 5 was carried out to obtain polyamide elastomer chips (A-18).

This elastomer had a content of polyether segments of 67%, a polyoxyethylene glycol residue content of polyether segments of 70%, a haze value of 3%, and a relative viscosity of 1.9.

Examples 1 to 15 and Comparative Examples 1 to 10

Each of strands prepared by kneading components in the proportions shown in Table 1 and Table 2 at 230° C. or 250° C. by means of a single-screw extruder was cooled with water and pelletized. Subsequently, the obtained pellets were dried and then injection-molded at a cylinder temperature of 230° C. or 250° C. and a mold temperature of 60° C.

The molded samples were allowed to stand at 23° C. and 55% RH for 2 days, after which their properties were measured. In addition, the transparency (haze value) of these molded products after immersion in water at 23° C. for 1 day was measured. The results are shown in Table 3 and Table 4.

The symbols of acrylic resins and additives used in Examples and Comparative Examples have the meanings described below. The temperature in each parenthesis is a cylinder temperature at the time of kneading and injection of a composition. Acrylic resin

- B-1: an acrylate resin, DELPET®60N (mfd. by ASAHI Chemical Industry Co., Ltd.): a copolymer resin consisting of 90% by weight of methyl methacrylate units and 10% by weight of methyl acrylate units. (230° C.)
- B-2: a copolymer resin consisting of 85% by weight of methyl methacrylate units and 15% by weight of ethyl acrylate units. (230° C.)
- B-3: an acrylate resin, DELPET®80N (mfd. by ASAHI Chemical Industry Co., Ltd.): a copolymer resin consisting of 97.5% by weight of methyl methacrylate units and 2.5% by weight of methyl acrylate units. (230° C.)
- B-4: an acrylate resin, DELPET® LP-1 (mfd. by ASAHI Chemical Industry Co., Ltd.): a copolymer resin consisting of 94% by weight of methyl methacrylate units and 6% by weight of methyl acrylate units. (250° C.)

Additives

- C-1: sodium dodecylbenzenesulfonate
- C-2: sodium dodecyldiphenyl ether disulfonate
- C-3: sodium diphenylphosphite

TABLE 1

|  | Polyamide elastomer | | Acrylic resin | | Additives | |
|---|---|---|---|---|---|---|
|  | Kind | Parts by weight | Kind | Parts by weight | Kind | Parts by weight |
| Example 1 | A-1 | 10 | B-4 | 89.5 | C-1 | 0.5 |
| Example 2 | A-2 | 10 | B-4 | 89.5 | C-1 | 0.5 |
| Example 3 | A-3 | 10 | B-3 | 89.5 | C-1 | 0.5 |
| Example 4 | A-3 | 20 | B-3 | 80.0 | — | — |
| Example 5 | A-3 | 6 | B-3 | 93.0 | C-1 | 1.0 |
| Example 6 | A-4 | 10 | B-2 | 89.5 | C-3 | 0.5 |
| Example 7 | A-4 | 10 | B-3 | 89.5 | C-2 | 0.5 |
| Example 8 | A-5 | 10 | B-1 | 89.5 | C-1 | 0.5 |
| Example 9 | A-6 | 20 | B-1 | 79.5 | C-1 | 0.5 |
| Example 10 | A-7 | 10 | B-4 | 89.5 | C-1 | 0.5 |
| Example 11 | A-8 | 10 | B-4 | 89.5 | C-1 | 0.5 |
| Example 12 | A-9 | 10 | B-4 | 89.5 | C-1 | 0.5 |
| Example 13 | A-10 | 10 | B-4 | 89.5 | C-1 | 0.5 |
| Example 14 | A-11 | 10 | B-4 | 89.5 | C-1 | 0.5 |
| Example 15 | A-18 | 10 | B-4 | 89.5 | C-1 | 0.5 |

TABLE 2

|  | Polyamide elastomer | | Acrylic resin | | Additives | |
| --- | --- | --- | --- | --- | --- | --- |
|  | Kind | Parts by weight | Kind | Parts by weight | Kind | Parts by weight |
| Comparative Example 1 | A-3 | 35 | B-3 | 65.0 | — | — |
| Comparative Example 2 | A-3 | 2 | B-3 | 97.0 | C-1 | 1.0 |
| Comparative Example 3 | A-12 | 10 | B-3 | 89.5 | C-1 | 0.5 |
| Comparative Example 4 | A-13 | 10 | B-4 | 89.5 | C-1 | 0.5 |
| Comparative Example 5 | A-14 | 10 | B-4 | 89.5 | C-1 | 0.5 |
| Comparative Example 6 | A-15 | 10 | B-4 | 89.5 | C-1 | 0.5 |
| Comparative Example 7 | A-16 | 10 | B-3 | 89.5 | C-1 | 0.5 |
| Comparative Example 8 | A-17 | 10 | B-1 | 89.5 | C-1 | 0.5 |
| Comparative Example 9 | A-17 | 6 | B-1 | 93.5 | C-1 | 0.5 |

TABLE 3

|  | Transmittance for whole light (%) | Haze value (%) | | Yellowness | Surface resistivity ($\Omega$) | Flexural modulus (kg/cm$^2$) |
| --- | --- | --- | --- | --- | --- | --- |
|  |  | Before immersion | After immersion |  |  |  |
| Example 1 | 91.5 | 4.4 | 4.8 | 2.3 | $5 \times 10^{11}$ | 28900 |
| Example 2 | 92.1 | 2.9 | 3.0 | 1.9 | $4 \times 10^{11}$ | 29000 |
| Example 3 | 92.2 | 4.0 | 4.2 | 1.9 | $1 \times 10^{12}$ | 29000 |
| Example 4 | 92.0 | 6.0 | 7.0 | 3.3 | $2 \times 10^{12}$ | 23200 |
| Example 5 | 92.0 | 3.8 | 3.9 | 1.8 | $6 \times 10^{12}$ | 31200 |
| Example 6 | 90.8 | 5.3 | 5.4 | 1.9 | $9 \times 10^{10}$ | 28700 |
| Example 7 | 91.4 | 4.5 | 4.6 | 1.8 | $8 \times 10^{11}$ | 28900 |
| Example 8 | 92.0 | 4.0 | 4.1 | 1.8 | $3 \times 10^{11}$ | 29100 |
| Example 9 | 90.5 | 6.3 | 6.5 | 3.5 | $1 \times 10^{12}$ | 23000 |
| Example 10 | 92.3 | 3.0 | 3.3 | 2.1 | $4 \times 10^{12}$ | 28900 |
| Example 11 | 92.5 | 2.3 | 2.9 | 1.9 | $8 \times 10^{12}$ | 28800 |
| Example 12 | 91.0 | 5.2 | 5.2 | 1.8 | $7 \times 10^{10}$ | 29000 |
| Example 13 | 92.3 | 2.6 | 2.6 | 1.8 | $9 \times 10^{10}$ | 28900 |
| Example 14 | 90.5 | 6.0 | 6.0 | 1.8 | $5 \times 10^{10}$ | 29000 |
| Example 15 | 91.6 | 4.0 | 4.3 | 2.4 | $6 \times 10^{11}$ | 28900 |

TABLE 4

|  | Transmittance for whole light (%) | Haze value (%) | | Yellowness | Surface resistivity ($\Omega$) | Flexural modulus (kg/cm$^2$) |
| --- | --- | --- | --- | --- | --- | --- |
|  |  | Before immersion | After immersion |  |  |  |
| Comparative Example 1 | 88.5 | 7.7 | — | — | $6 \times 10^{11}$ | 16000 |
| Comparative Example 2 | 92.4 | 2.7 | — | — | $7 \times 10^{14}$ | 32700 |
| Comparative Example 3 | 85.6 | 14.1 | — | — | $4 \times 10^{14}$ | 28800 |
| Comparative Example 4 | 87.5 | 8.5 | — | — | $3 \times 10^{10}$ | 29000 |
| Comparative Example 5 | 92.0 | 3.4 | — | — | $1 \times 10^{14}$ | 28700 |
| Comparative Example 6 | 92.1 | 3.1 | — | — | $8 \times 10^{14}$ | 28900 |
| Comparative Example 7 | 92.1 | 3.0 | 8.0 | 1.9 | $1 \times 10^{11}$ | 28800 |
| Comparative Example 8 | 90.1 | 4.9 | 10.3 | 7.1 | $4 \times 10^{11}$ | 28800 |
| Comparative Example 9 | 91.2 | 4.0 | 9.0 | 4.6 | $6 \times 10^{12}$ | 31000 |

INDUSTRIAL APPLICABILITY

The acrylic resin composition of the present invention comprises an acrylic resin, at least one transparent polyamide elastomer containing hard segments and soft segments in a specified ratio, and optionally at least one electrolyte, and is characterized, for example, in that it has excellent permanent antistatic properties, is only slightly deteriorated in transparency when immersed in water, has a very faint color, and is inexpensive. Said composition can be suitably used, for example, as a material capable of preventing electrostatic electrification in various parts of electronics products, household appliances, office automation appliances and the like, such as illuminators, nameplates on machinery and tools, and meter covers.

We claim:

1. An acrylic resin composition comprising (A) 70 to 97% by weight of an acrylic resin based on the total weight of the acrylic resin composition, (B) 3 to 30% by weight of at least one polyamide elastomer based on the total weight of the acrylic resin composition, and (C) 0 to 10% by weight of at least one electrolyte selected from the group consisting of organic sulfonates and organic phosphates based on the total weight of the acrylic resin composition;

wherein the component (B) polyamide elastomer comprises (a) polyamide segments and (b) polyether segments, and the content of the constituent (a) polyamide segments is 25 to 60% by weight based on the total weight of component (B), and wherein the constituent (b) polyether segments comprise polyoxyalkylene residues containing 30 to 99% by weight of polyoxyethylene residues, based on the total weight of the polyoxyalkylene residues, and have a number average molecular weight of 500 to 4000.

2. The acrylic resin composition according to claim 1, wherein the component (B) is a polyamide elastomer having a repeating unit represented by at least one of the following formulas (1) and (2):

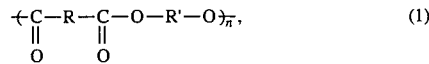 (1)

and

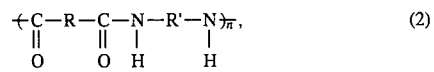 (2)

wherein

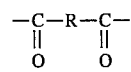

represents a polyether segment and —O—R'—O— or

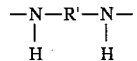

represents a polyether segment, and n represents a natural number.

3. The acrylic resin composition according to claim 1, wherein the constituent (a) polyamide segments are formed from a polymer obtained from:

(i) an aminocarboxylic acid having 6 or more carbon atoms, a lactam, a salt of a diamine having 4 or more carbon atoms with a dicarboxylic acid, or a mixture thereof, and (ii) at least one dicarboxylic acid connecting agent selected from the group consisting of adipic acid, sebacic acid, dodecanedicarboxylic acid and terephthalic acid.

4. The acrylic resin composition according to claim 1, wherein the polyoxyalkylene residues other than polyoxyethylene, which constitute the constituent (b) polyether segments, are residues of a polyoxypropylene, a polyoxytetramethylene, a polyoxyhexamethylene, or a polyoxyethylene-polyoxypropylene glycol block copolymer.

5. The acrylic resin composition according to claim 4, wherein the polyoxyalkylene residues other than polyoxyethylene are polyoxytetramethylene residues.

6. The acrylic resin composition according to claim 1, wherein the content of the constituent (a) polyamide segments is 25 to 45% by weight based on the total weight of component (B).

* * * * *